United States Patent
Wimberley

(10) Patent No.: US 8,123,271 B1
(45) Date of Patent: Feb. 28, 2012

(54) COLLAPSIBLE BUILT-IN TAILGATE BENCH SEAT

(76) Inventor: Brandon Wimberley, Uvalde, TX (US)

( * ) Notice: Subject to any disclaimer, the term of this patent is extended or adjusted under 35 U.S.C. 154(b) by 0 days.

(21) Appl. No.: 13/280,451

(22) Filed: Oct. 25, 2011

Related U.S. Application Data

(60) Provisional application No. 61/407,237, filed on Oct. 27, 2010.

(51) Int. Cl.
*B60N 2/00* (2006.01)
(52) U.S. Cl. .............. 296/63; 296/57.1; 296/69
(58) Field of Classification Search ............ 296/63, 296/69
See application file for complete search history.

(56) References Cited

U.S. PATENT DOCUMENTS

| | | | |
|---|---|---|---|
| 5,000,504 A * | 3/1991 | Munguia | 296/65.07 |
| 5,516,193 A | 5/1996 | Simpson | |
| 5,975,610 A | 11/1999 | Tracy | |
| 6,116,676 A | 9/2000 | Edwards | |
| 6,203,108 B1 | 3/2001 | Mattison, Jr. | |
| 6,824,186 B2 | 11/2004 | Brown | |

* cited by examiner

*Primary Examiner* — Joseph Pape
(74) *Attorney, Agent, or Firm* — Alexander Boyer; Daniel Boudwin

(57) ABSTRACT

A foldable, thin plate seat frame that is permanently built-in to the tailgate of a pickup truck or sport utility vehicle. The device comprises a foldable bench seat, having a bottom seat plate and a back support plate. The device is built-in to a tailgate along its interior side and folds flush thereagainst, locking into place such that a user does not need to uninstall the device when in a stowed position. Cushions can be attached to the extended seat frame when the device is in a working position for added comfort. The seat frame folds about a hinge that separates the bottom seat plate and the back rest plate of the device. When the seat is in the open configuration, the seat frame hinge rests above the jamb of the open tailgate such as to not interfere with the tailgate's ability to open or close.

10 Claims, 3 Drawing Sheets

COLLAPSIBLE BUILT-IN TAILGATE BENCH SEAT

CROSS REFERENCE TO RELATED APPLICATION

This application claims the benefit of U.S. Provisional Application No. 61/407,237 filed on Oct. 27th, 2010, entitled "Built-In Tailgate Chair."

BACKGROUND OF THE INVENTION

1. Field of the Invention

The present invention relates to vehicle seating devices for use in a truck bed. More specifically, the present invention describes a permanently built-in tailgate seating option that attaches to the interior side of a vehicle tailgate. The device comprises a bench seat frame having a backrest plate and a seat plate, to which cushions may be attached. The present invention can be deployed during tailgate parties as a bench seat for general use when the tailgate of the vehicle is in a horizontal position, thereby allowing the backrest plate to be opened and accept seated users.

2. Description of the Prior Art

Tailgating is a very popular past time. It is very common to find groups of individuals tailgating at professional sporting events, high school sporting events, county fairs, parades and hunting expeditions. Tailgating is a social activity often associated with outdoor gatherings involving food, friends, drinks and activities prior to or during an event. The very term "tailgating" references the tailgate of a vehicle, whereby individuals utilizes the cargo capacity of the vehicle to carry supplies and setup a temporary gathering place there around for enjoyment and socializing. Individuals may congregate around the bed of a pickup truck or sport utility vehicle to engage in outdoor activities such as barbequing and throwing a sports ball around of some sort while consuming refreshments and food.

Typically the tailgate of the pickup truck or sport utility vehicle is placed in the open configuration providing the gathered individuals with a place to sit. It is very common for individuals to sit on the tailgate of a vehicle during tailgate activities. While the tailgate is a convenient place to sit, it is often uncomfortable because of their rigid construction and hard exterior surface. Alternatives to sitting on the tailgate include sitting in individual folding chairs around the vehicle or on coolers. Unfortunately, individual folding chairs seat only one individual at a time and coolers offer no back support to the individual seated thereupon. A bench-style, padded seat with a back support can seat multiple individuals at once and would offer those seated upon it much needed back support and comfort.

There have been multiple attempts to develop tailgate seating devices that are portable, detachable and meant to be permanently affixed to a tailgate of a vehicle. For example, U.S. Pat. No. 5,516,193 to Simpson describes a portable, foldable stadium seat device that is capable of seating a single individual. The device is intended to make the seating experience more enjoyable by providing a user with a more comfortable place to sit, as well as to elevate the user slightly higher than he or she would be if sitting on the bench without the use of the Simpson device. The device has a seat and a back rest that folds in half at a junction between the seat and the back rest. The device is designed for attaching to any sort of bench-like seat, including bleachers, tailgates and bench seats. The bottom rear of the device has a small gripping hook that a user will catch on the back edge of the bench surface he or she is attempting to attach the Simpson portable stadium seat thereto. The bottom front of the device has adjustable hooks that catch the front edge of the bench surface, and are adjusted to securely fasten the seat to the bench. The device could further be used on a tailgate when a tailgate is in the open configuration.

Similarly, U.S. Pat. No. 6,203,108 to Mattison Jr. describes a portable folding-chair specifically designed to clip onto the tailgate of a pickup truck or sport utility vehicle when the tailgate is in the open configuration. The chair has a bottom seat, a back rest and arm rests on either side and comfortably seats a single individual. The chair sits on top of two clips that grip onto the edge of the tailgate to prevent the chair from moving around while in use. All parts of the chair frame and clips that make physical contact with the truck bed are coated with a scuff-proof material to prevent any damage to the truck bed from the chair resting thereon. The frame of the chair is hollow, making the device very light and easy to carry and manipulate. When not in use, the chair folds upon itself for compact storage of the device during transport.

The Simpson and Mattison Jr. devices are only capable of seating a single individual at one time. Users of these devices must sit isolated from others at the tailgate activity, and only a few of these devices would be able to be attached to a tailgate at one time, limiting the total number of individuals who may utilize the tailgate as a seating option. The present invention offers a bench-style seating device that allows for multiple users to sit on the device at once in close proximity to one another as there are no arm rests to separate or compartmentalize the individual's seating location.

U.S. Pat. No. 6,116,676 to Edwards describes a seating device for use with the tailgate of a vehicle. The device features a pair of seats with a multifunctional arm rest, drink holder and storage compartment in between the two seats. Each seat has a bottom seat and a back support. The seat and back support of the device can be folded down at a pivot axel where the bottom seat meets the back support. Located at the center of the underside of the bottom seat, as well as the backside of the back support, there is an attachment means for connecting a contractual hook to the seat. Contractual hooks are large, broad, flat hooks that attach the seats of the device to the tailgate of the vehicle. Based on the preference of the user, the contractual hooks can either be secured to the backside of the back support of the device and hung on a closed tailgate, or the contractual hooks can be attached to the bottom side of the bottom seat and the device can be clipped onto the tailgate when the tailgate is in the open configuration. The hooks incorporate a tightening mechanism that allows for a user to tighten the hooks, causing the hooks to contract, which, in turn, enhances the grip of the hook on the tailgate, preventing the seats from moving during use.

The Edwards device offers room for two individuals to sit on the device at once. The device is compartmentalized so that each individual using the device has his or her own place to sit, with his or her own arm rests and cup holders. The present invention provides users with a bench-like seating option, which can accommodate more than two individuals at once.

U.S. Pat. No. 5,975,610 to Tracy describes a mountable tailgate seating device. The device is a bench seat that comprises a seat and a back rest and can be mounted to a tail gate and is designed for easy removal from the tail gate if necessary so as not to impede the use of the truck bed and tailgate for other purposes. The device also features a flat plank that is hitched to the top of the back rest portion of the device, which is rotatable. This flat plank may be used as a table-like surface behind the seat, extending in the opposite direction that the seat is facing. The plank has latches on each of the top corners that can be placed in a position where the latches protrude beyond the parameters of the plank, which enables the plank to rest on the upper ledge of the truck bed to form the table-like surface. When the latches are in a closed position, not protruding beyond the parameters of the plank, the plank also serves as a cover for the seat when the tailgate is either in the closed configuration or in the open configuration.

While the Tracy device is intended for mounting to a truck tailgate, the Tracy device does not fold into a compact form. Rather, if the Tracy device is attached to the tailgate while the tailgate is in the closed position, the seat is positioned with the back rest portion of the device within the bed of the truck. The hinged cover plate orients such that it covers the seat of the device, thus occupying a volume of space in the truck bed that cannot be used for other purposes. The present invention mounts to the tailgate of a vehicle, but is capable of folding into a compact and flat closed configuration to reduce the amount of space occupied within the bed of the truck when the tailgate is in the closed position.

U.S. Pat. No. 6,824,186 to Brown describes a foldable seat system for use with the tailgate of a truck bed. The seat is a bench-style seat with a back support and seat, which are hinged together. The device spans the length of the truck tailgate. The device also incorporates a rigid support pole that spans the truck bed, parallel to the tailgate. When the tailgate is down, the device is in the open and useable L-shape position. In the open position, the bottom seat cushion of the device rests on the open tailgate, and the back support cushion of the device rests against the support pole. When the tailgate is vertical and in the closed position, the Brown device folds at the hinge between the back support cushion and the bottom seat cushion into a U-shape and is stored in place at the rear of the truck bed, against the tailgate, by the support pole.

The hinge on the Brown device allows the back support of the device to pivot freely and thus requires that a support pole be installed, in addition to the device, as a means of preventing the back support of the device from opening so widely that the device cannot properly serve as a seat. The support pole either mounts into the truck bed, or, alternatively, the support pole can be a jamb-type pole, meaning the pole is placed in the truck bed and extended by some mechanism until the pole is fixed in place. The Brown device requires both the installation of the bench seat and the support bar, which is time consuming and unnecessary when compared to the operation and construction of the present invention.

The devices in the prior art present several drawbacks. For example, with the exception of the Tracy device, none of the described prior art devices teach a built-in tailgate seating device that is intended to remain permanently thereto, even when not in use. The present invention suggests a frame that is compact so as to not occupy volume within the truck bed when not in use, while allowing the device to remain attached to the interior surface of the tailgate when not in use. This stowed position and the built-in nature of the device requires that no amount of time be spent on the installation and removal of the device before or after each activity. The only installation required in order to use the present invention is the quick attachment of the bottom seat cushion and the back support cushion, wherein this can be accomplished once, and the device may remain in position until the user is ready to deploy the seat back for use.

The present invention therefore substantially diverges in design elements from the prior art, and consequently it is clear there is a need in the art for an improvement to existing built-in tailgate seating devices. In this regard the instant invention substantially fulfills these needs.

SUMMARY OF THE INVENTION

In view of the foregoing disadvantages inherent in the known types of seating devices for use in conjunction with a truck or sport utility vehicle tailgate now present in the prior art, the present invention provides a new, built-in tailgate seating device frame with detachable seat cushions wherein the same can be utilized for providing convenience for the user since the amount of time required to prepare the seat frame for use as a seat is greatly reduced compared to the prior art, as it is permanently built-in to the tailgate of a vehicle. A user lowers the vehicle tailgate, unlocks the seat frame, places the frame in the open configuration and attaches the seat cushions to the frame before use.

It is therefore an object of the present invention to provide a new and improved built-in tailgate seating device that has all of the advantages of the prior art and none of the disadvantages.

It is another object of the present invention to provide a user with a seating device that is permanently built-in to the tailgate of a vehicle, whereby the seat frame of the device folds and locks into a compact space when not in use such that a user does not have to uninstall the device from the tailgate when the device is not in use.

Yet another object of the present invention is to provide a comfortable seating option that provides the user with a cushioned place to sit and provides back support for a plurality of seated individuals in a bench seat configuration.

A final object of the present invention is to disclose a tailgate seating device that has a stowed positioned against the interior surface of a vehicle tailgate, such that it occupies minimal volume within the bed of the vehicle when not in use.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
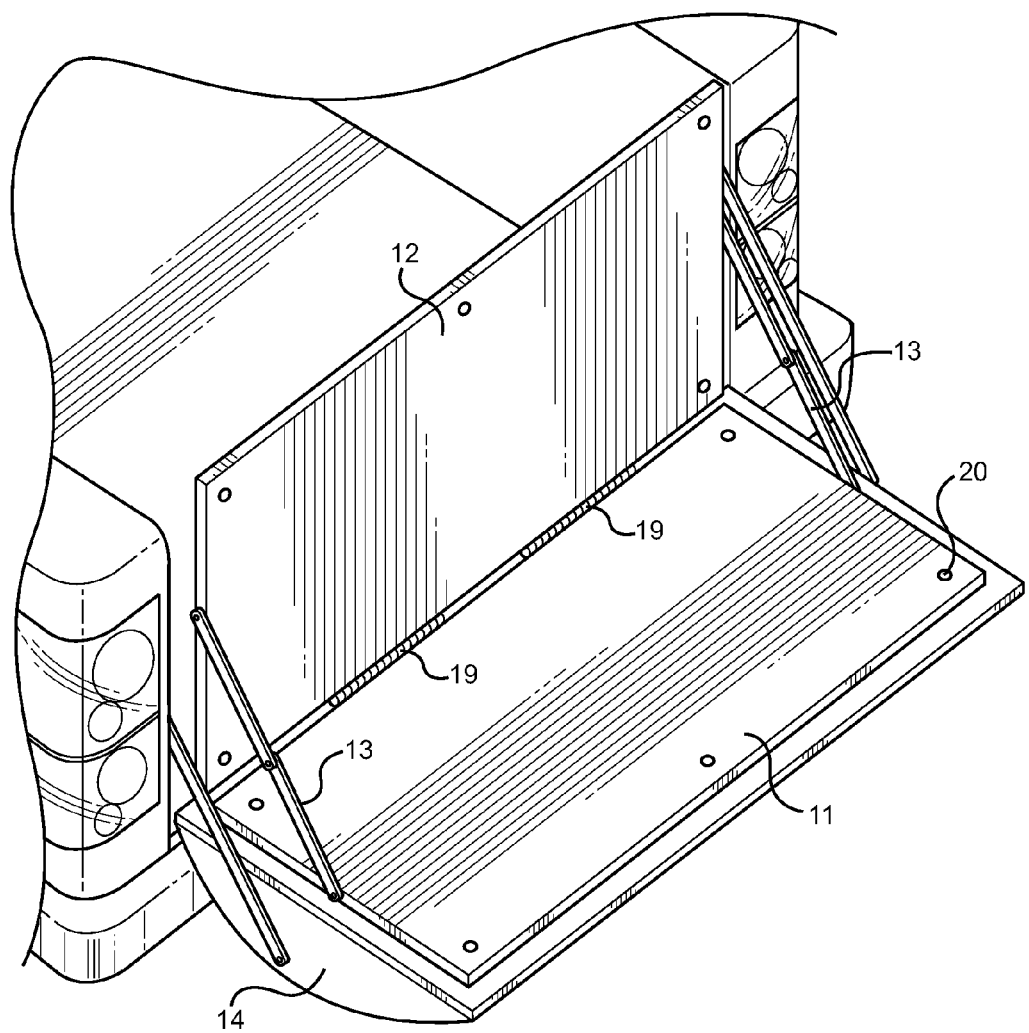
FIG. 1 is a perspective view of the present invention, illustrating how the device is attached and built into a vehicle tailgate.

Reference is made herein to the attached drawings. Like reference numerals are used throughout the drawings to depict like or similar elements of the built-in tailgate seat device described by the present invention. For the purposes of presenting a brief and clear description of the present invention, the preferred embodiment of the present invention will be discussed as built-in to a truck tailgate. The figures are intended for representative purposes only and should not be considered to be limiting in any respect.

Referring now to FIG. 1, there is shown the built-in tailgate seating device of the present invention. The seating device comprises a seat frame having two thin plates; one serving as a bottom seat plate 11 and the other serves as a back rest plate 12. The seat frame is capable of folding in half at a hinge 19 that joins the bottom seat plate 11 and a back rest plate 12 along a common edge. As such, the seat frame has two configurations, an open, working configuration, wherein the seat frame resembles a bench seat, and a closed, stowed configuration, wherein the seat frame is folded and locked into a compact, flattened form against the inner surface of the vehicle tailgate 14. On either side of the seat frame, there exists a support brace 13 that attaches to both the bottom seat plate 11 and the back rest seat plate 12 of the device. The purpose of the brace is to limit how widely the seat frame hinge 19 may open when the frame is in the open configuration so the device can function as a useful seat with a defined recline. The brace 13 could be, but is not limited to, a hook and knob pairing, a stay or a tether designed to limit the travel of the hinge. A plurality of cushion attachment means 20 exists on both the bottom seat plate 11 and the back rest seat plate 12. When the seat frame is in a folded configuration, the brace 13 does not interfere with the mating of the back rest seat plate 12 and the bottom seat plate 11, folding along the outer edges of each plate.

It is contemplated that the present invention is incorporated into the tailgate of the pickup truck or sport utility vehicle as part of the manufacturing process of the vehicle or during an aftermarket installation. In the alternative, the built-in tailgate seating device is installed post-manufacture of the vehicle; for example, the present invention could be built-in to the tailgate portion of a truck bed liner, which is installed on the vehicle in a near-permanent configuration, wherein its position is static and not necessarily removable after each use. The plates of the device 11, 12 fold together into a stowed configuration, wherein the device consumes minimal volume within the bed of the vehicle when not in use. When the tailgate 14 is lowered, the device can be expanded into a working position, placing the seat back portion 12 into an upright configuration.

Figure 2:
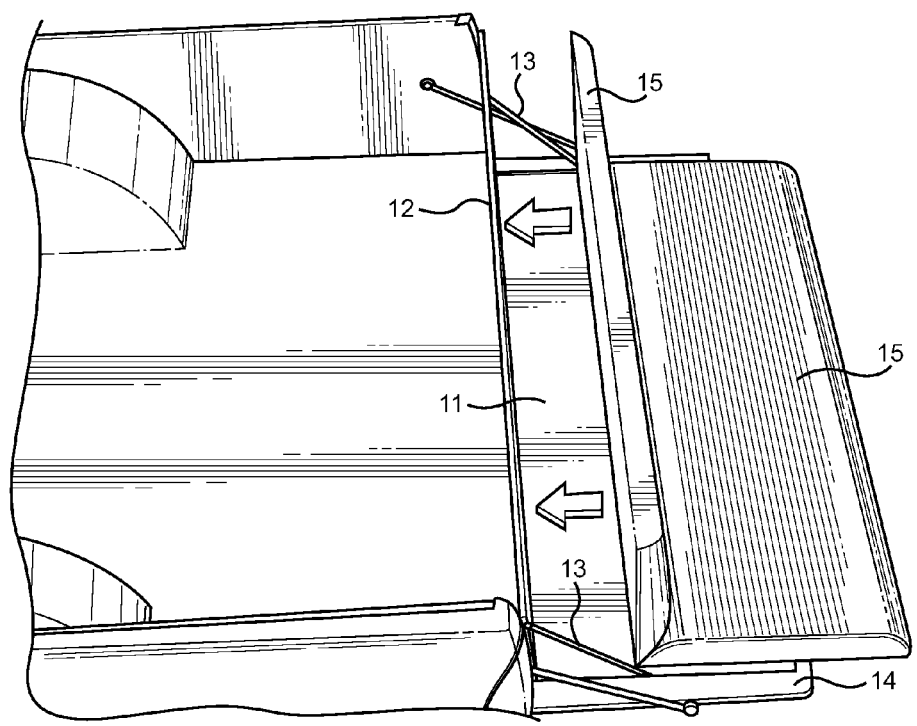
FIG. 2 is a perspective view of the present invention built into a truck tailgate as seat cushions are being attached to the plate seat frame of the device.

Referring now to FIG. 2, there is shown a perspective view of the present invention built into a truck tailgate 14 as cushions 15 are being attached to the device. The device comprises a thin plate seat frame, wherein cushions are attachable thereto for improved comfort. Seat cushions 15 can be attached to the seat frame of the present invention when the seat frame is in the open and working configuration. The cushions 15 are comprised of a wrapped first and second seat cushion portion attached along a common edge and filled with foam or similar cushion material. The first and second cushions are adapted to fold with respect to one another and mate flushly against the seat frame. The cover of the cushion may be a waterproof or water resistant material, and manufactured in a variety of colors and sizes, with special logos, team colors or having pictures of mascots printed thereon. The cushions are adapted to attach to the seat frame by a variety of means, including but not limited to, hook and eye fasteners, a series of snaps, magnets or strips hook and loop fasteners.

Figure 3:
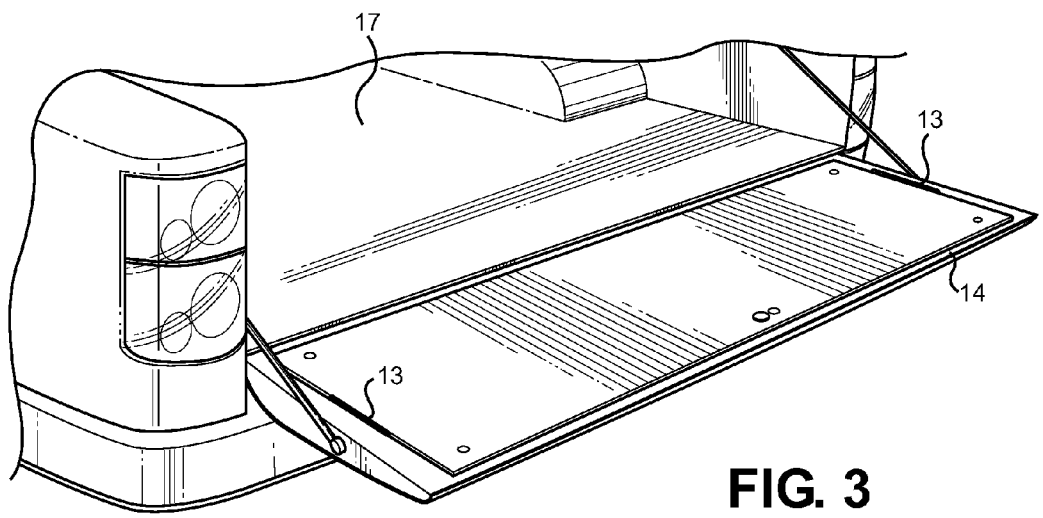
FIG. 3 is a perspective view of the thin plate seat frame of the present invention built-in to the tailgate of a truck, which has been compactly folded and locked in the closed configuration.

Referring now to FIG. 3, there is shown a perspective view of the present invention while built into a truck tailgate 14 in the closed, flat and locked configuration with the cushions removed. To close the seat frame, a user must remove the seat cushions and fold the back support plate of the device at the hinge such that the back support plate of the seat frame lies flush with the bottom seat plate. The braces 13 on either side of the seat frame will easily allow for the seat frame to collapse and can serve as a locking mechanism to keep the plates of the frame in a flat configuration. When the present invention is in the closed configuration, the seat frame takes up very little space within the bed of the vehicle 17, as it lies flat against the tailgate 14 and allows for the tailgate to be used as in normal operation.

Figure 4:
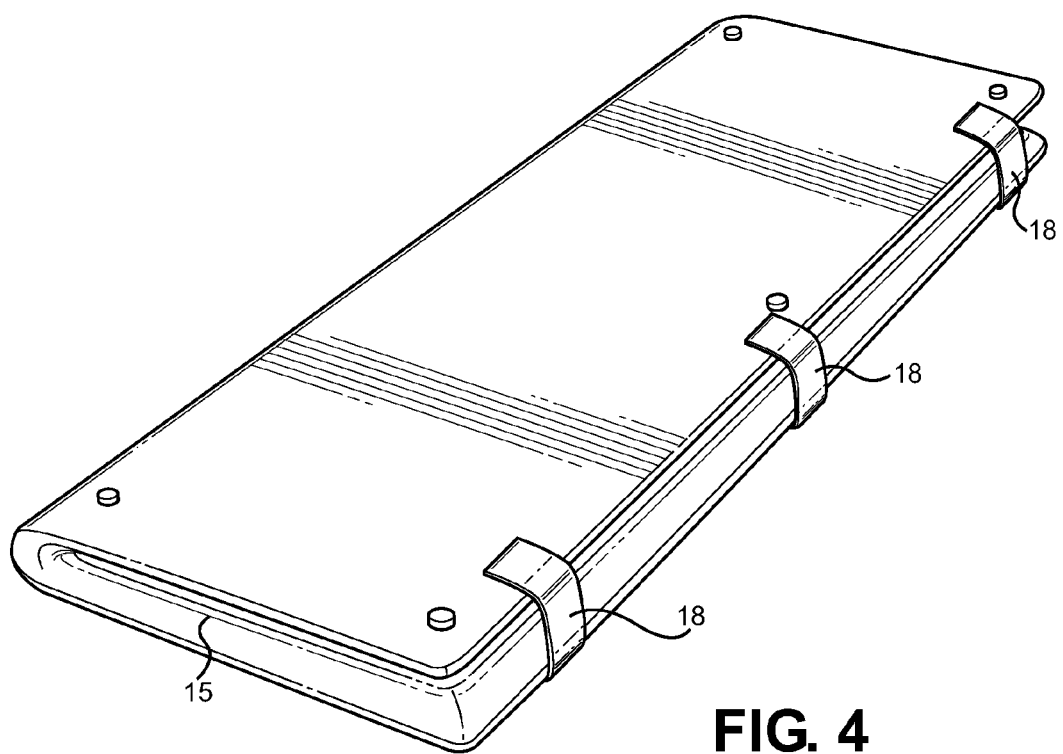
FIG. 4 is a perspective view of the present invention cushions when not installed on a tailgate, not in use and in a folded and locked configuration.

Referring now to FIG. 4, there is shown a perspective view of the present invention seat cushions when not mounted to the seat frame. The cushions are completely removable from the seat frame when the device is in a stowed position. If desired, the cushions may be sandwiched between the seat back and bottom seat plate when stowed, however, a smaller cushion, or one that can remain outdoors for a greater length of time may be required. Preferably, the cushion can be stored in a garage or storage area, in its compact, folded state.

Use of the present invention is not limited only to tailgating for the purposes of attending sporting events or barbeque events. The present invention can be useful for general outdoor seating purposes, such as a resting place for construction workers who are on the job site with nowhere else to sit, or the device can be used as a place to perch during a hunting or fishing expedition. Furthermore, the size of the overall device is not limited. The present invention can be manufactured in a variety of sizes to accommodate use with various sized vehicle tailgates.

The bottom seat plate of the device is adapted to mate flushly with the interior surface of a vehicle tailgate and attach thereto using an attachment means. These include a series of fasteners or similar structural attachment. The plate mates flushly against the tailgate and is retained thereon while the device is in use or while the device is in a stowed configuration and the tailgate is in a closed configuration. It is desired to disclose a bench-style seat that can be built into the tailgate and function as an expandable resting location for users in a variety of tailgate situations. In an alternative embodiment, the seat plate is integrated into the inner surface of the tailgate, and the braces and seatback plate connect thereto. This embodiment eliminates the need for an attached plate, and utilizes a flat section of the tailgate as a location to attach the seat cushions and provided support for seated users. This embodiment may be provided by the manufacturer as a tailgate option.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A built-in, foldable tailgate seat device comprising:
a bench-style seat having a seat frame with a bottom seat plate and a back rest seat plate;
said bottom seat plate and said back rest seat plate being connected by a hinge along a common edge;
a set of braces attaching between said bottom seat plate and back rest seat plate to limit said hinge travel;
an attachable cushion having a first and second seat cushion, where said cushions features a cushion attachment means for attaching to said seat frame;
said cushion having a plurality of closing cuffs for securing said cushion into a folded state
said bottom seat plate attached to an interior surface of said foldable tailgate.

2. The device of claim 1, wherein said seat frame is capable of achieving two configurations, an open configuration, wherein said device resembles said bench-style seat, and a folded, closed configuration, wherein said back rest seat plate folds into a compact and flattened form, said back rest plate lying completely flush against said bottom seat plate.

3. The device of claim 1, wherein said braces are stays.

4. The device of claim 3, wherein said stays also function as a locking mechanism to keep said seat frame in said compact and flattened form when said device is in said closed configuration.

5. The device of claim 1, wherein said cushion attachment means is a series of snaps.

6. The device of claim 1, wherein said cushions are covered in a waterproof material.

7. The device of claim 1, wherein bottom seat plate attaches to said tailgate interior surface via a plurality of fasteners.

8. The device of claim 7, wherein said attachment does not interfere with said tailgate jamb.

9. The device of claim 1, wherein bottom seat plate further comprises a flat section of said tailgate interior surface, whereby said section functions as said seat plate, and said braces and said seatback plate attach directly to said tailgate interior surface.

10. The device of claim 8, wherein said flat section does not interfere with said tailgate jamb.

* * * * *